United States Patent [19]
Kanij et al.

[11] 3,935,120
[45] Jan. 27, 1976

[54] ANION-DEFICIENT ACTINIDE NITRATE SOLUTION

[75] Inventors: Johannes Bastiaan Willem Kanij, Zevenaar; Arend Jaman Noothout, Oosterbeek, both of Netherlands

[73] Assignee: Stichting Reactor Centrum Nederland, The Hague, Netherlands

[22] Filed: May 30, 1973

[21] Appl. No.: 365,197

[30] Foreign Application Priority Data
June 5, 1972 Netherlands .................... 7207572

[52] U.S. Cl. ... 252/301.1 R; 252/301.1 S; 423/251; 423/260; 423/263
[51] Int. Cl. .............................................. C09k 3/00
[58] Field of Search ........... 423/251, 250, 3, 5, 260, 423/263; 252/301.1 S, 301.1 R

[56] References Cited
FOREIGN PATENTS OR APPLICATIONS
7,200,219   7/1972   Netherlands

*Primary Examiner*—Benjamin R. Padgett
*Assistant Examiner*—R. E. Schafer
*Attorney, Agent, or Firm*—Cushman, Darby & Cushman

[57] ABSTRACT

The invention relates to a method for the preparation of aniondeficient actinide nitrate solutions. Anion deficient actinide nitrate solutions are used for the preparation of ceramic spherical ceramic nuclear fuel.

According to the invention one or more actinide oxides selected from the group of $PuO_2$, $UO_2$, $U_3O_8$, $UO_3$ of oxides ranging between $UO_2$ and $UO_3$ are dissolved in one or more actinide nitrates which are molten in their water of crystallination. The obtained mixture is subsequently diluted with water.

8 Claims, No Drawings

ANION-DEFICIENT ACTINIDE NITRATE SOLUTION

The invention relates to a method for the preparation of an anion-deficient actinide nitrate solution.

According to known methods of earlier art, it is an existing practice to prepare such solutions by dissolving actinide oxides in an aqueous solution of uranyl nitrate or thorium nitrate. The anion-deficient actinide salt solutions obtained find technical application as starting material for preparing fissile substances through the medium of sol-gel processes. For some sol-gel processes the strength of concentration of the starting material frequently has to be 3–4 molar.

In many cases the anion-deficient salt solution is required to be highly concentrated. During concentration it may happen under certain conditions, depending upon the temperature and the strength of concentration, that $UO_3$ hydrates undergo crystallization. The crystals formed often will not fully re-dissolve on diluting the solution. These crystallization effects are troublesome in that they prevent continuous processing, besides causing losses. Loss of fissile material in the precipitates formed is in fact a costly occurrence if, for instance, enriched uranium is being processed, necessitating an expensive recycling process.

The invention aims at obviating this drawback by providing a method of preparation in which makes concentration unnecessary. Moreover, in some cases a uranium dioxide that has been sintered at a high temperature and is consequently very difficult to dissolve afresh, can according to the aforementioned method be very easily processed to ceramic nuclear fissile material.

The invention provides for using, instead of an aqueous actinide salt solution, a hydrated actinide nitrate which is melted in its own water of crystallization. The mixture, after being dissolved, is mixed with water to the desired degree of ion concentration. The actinide oxides to be dissolved may be selected from the group of $PuO_2$, $UO_2$, $U_3O_8$, $UO_3$ or lower oxides than $UO_3$, located between $UO_2$ and $UO_3$. Some deviation from stoichiometry is possible with the said compounds in so far as they are stated with exact formulas.

The compounds $Th(NO_3)_4 \cdot 4H_2O$, $UO_2(NO_3)_2 \cdot 6H_2O$ or mixtures of these salts may be used as hydrated actinic nitrates.

Thorium nitrate offers the advantage that uranium oxides with an unfavourable (in fact highly unfavourable) texture, which in this case means low specific surface area, can be dissolved. Fissile substances containing thorium are of importance for thermal breeding reactors. $UO_3$ is a compound that can very easily be dissolved in molten $Th(NO_3)_4 \cdot 4H_2O$. A preferred embodiment for the new method consists in adding the actinide oxide in small amounts to the molten salt mixture. The dissolving of $UO_2$ in molten uranyl nitrate proved somewhat more difficult than dissolving it in thorium nitrate. It is therefore advisable in this case to use a $UO_2$ that has a high specific surface area. A suitable $UO_2$ in this connection has a specific surface area between 5 and 20 $m^2$ per gram.

The qualities of the ceramic fissile substances to be prepared from the anion-deficient salt solution can be improved by adding one or more other compounds to the melt during solution. Such compounds may, for instance, be metal oxides that are soluble in the melt, metal salts or borium compounds that are soluble in the melt.

The metal salts and metal oxides may, without thereby exhausting all the possibilities, be selected from among the elements of the group Al, Y, Sc, Nb, Ta, Zr, Hf or all rare-earth metals.

The following examples may serve to elucidate the invention without thereby restricting its scope. Example I relates to the dissolving of a difficulty soluble $UO_2$ in molten thorium nitrate. Examples II and III relate to the dissolving of $U_3O_8$ and $UO_3$ respectively in molten thorium nitrate. It is evident from Example III that $UO_3$ dissolves particularly well in molten thorium nitrate. Example IV relates to the dissolving of $UO_2$ in molten uranyl nitrate. The $UO_2$ is, moreover, added in small quantities to molten uranyl nitrate.

Examples V and VI relate to the dissolving of $UO_3$ and $U_3O_8$ in molten uranyl nitrate. It was found that $U_3O_8$ and $UO_3$ dissolve more difficulty than $UO_2$ in molten uranyl nitrate.

EXAMPLE I

According to this example powdered $UO_2$ was dissolved in thorium nitrate that had been melted in its own water of crystallization. The powdered $UO_2$ had been sintered in Dawson gas (25 % $H_2$ and 75 % $N_2$) at a temperature of 1400°C. The specific surface area was less than 1 $m^2$ per gram; the size of crystallite as determined by X-ray diffraction was about 1000 A. Of the above-mentioned $UO_2$, 1.0 gram was mixed with 18.4 grams of $Th(NO_3)_4 \cdot 4H_2O$. Next, the mixture was heated to about 90°C, causing the thorium nitrate to melt in its water of crystallization. After about ½ to 1 hour the whole of the uranium oxide had been dissolved and a viscous dark-red liquid formed. The dark-red liquid obtained was diluted to an actinide concentration of from 3 to 3.5 molar. This dilution served to prevent crystallizing of solid substances at the ambient temperature.

EXAMPLE II

In this example a $U_3O_8$ with a size of crystallite of from 400 to 500 A was dissolved in molten thorium nitrate. The said $U_3O_8$ had been obtained by heating ADU in air at 800°C. The further operations and results were identical with Example I except for the quantity of $Th(NO_3)_4 \cdot 4H_2O$, which was 17.7 grams.

EXAMPLE III

One gram of $UO_3$, obtained by heating ADU at 500°C in air, was dissolved in 17.4 grams of molten $Th(NO_3)_4 \cdot 4H_2O$. The further data are identical with those of Examples I and II except for the dissolving time, which was only 5 minutes, and the colour of the viscous liquid obtained, which was yellow.

EXAMPLE IV

A quantity of $UO_2$ with a specific surface area between 11 and 16 $m^2$ per gram was dissolved in molten uranyl nitrate by adding minute quantities at a time. The $UO_2$ employed, which had a size of crystallite ranging between 200 and 300 A, had been obtained by reducing $UO_3$ in Dawson gas (25 % $H_2$ and 75 % $N_2$) at a temperature of 500°C.

A quantity of 10.0 grams of $UO_2(NO_3)_2 \cdot 6H_2O$ was melted by being heated to a temperature of 60°–70°C. Next, an amount of 0.697 gram of the above-mentioned $UO_2$ was dissolved in the melt by adding small amounts at a time. During the melting process the uranyl nitrate was to some extent decomposed, with liberation of nitrous vapours and evaporation of some water. The total dissolving time was about 15 minutes. After dissolution a yellow viscous liquid was formed, which was diluted with water to a strength of uranium concentration of 1.54 millimols per gram or 1.54 mols per kilogram, the molar nitrate-to-uranium ratio of the dilute solution being 1.68;

$\rho = 1.86$ grams per cm$^3$, corresponding to 2.85 mols per liter. This strength of concentration is sufficiently high for the production of globular ceramic particles of fissile material according to the sol-gel process.

EXAMPLE V

According to the method set forth in Example IV, 0.51 gram of $UO_3$ was dissolved in 9.41 grams of molten $UO_2(NO_3)_2 \cdot 6H_2O$.

It can be calculated from the foregoing data that the nitrate-to-uranium ratio of the melt obtained is 1.83.

The $UO_3$ used was a uranium trioxide as normally obtainable on the market.

EXAMPLE VI

An amount of 0.61 gram of $U_3O_8$ was dissolved in 9.35 grams of molten $UO_2(NO_3)_2 \cdot 6H_2O$ according to the method set forth in Example IV. The calculated nitrate-to-uranium ratio of the melt obtained is 1.76.

The $U_3O_8$ had been obtained by heating the $UO_3$ of Example V for an hour in air at a temperature of 700°C.

We claim:

1. A method for the preparation of a concentrated anion deficient actinide nitrate solution, the actinide metals being chosen from the group of four valent plutonium, hexavalent uranium and four valent thorium, wherein undesired precipitates of $UO_3$ hydrates are avoided, by dissolving one or more oxides from the group $PuO_2$, $UO_2$, $U_3O_8$, $UO_3$ or lower oxides than $UO_3$, located between $UO_2$ and $UO_3$ in molten $UO_2(NO_3)_2 \cdot 6H_2O$ or molten $Th(NO_3)_4 \cdot 4H_2O$ and mixtures thereof at a temperature of at least 60°C, whereafter the obtained melt is diluted with water to the desired concentration.

2. A method according to claim 1, wherein $UO_3$ is dissolved in molten $Th(NO_3)_4 \cdot 4H_2O$.

3. A method according to claim 1, wherein the actinide oxide is added in small quantities to the molten actinide nitrate.

4. A method according to claim 1, wherein a $UO_2$ with a specific surface area ranging between 5 and 20 m$^2$ per gram is dissolved in molten $UO_2(NO_3)_2 \cdot 6H_2O$.

5. A method according to claim 1, wherein a minute amount of one or more metal salts are added to the molten salt, preferable such metal salts as will permit of hydrolyzation, metal oxides that are soluble in the melt, or borium compounds that are soluble either in water or in the melt.

6. The process of claim 1 wherein $UO_2$, $U_3O_8$ or $UO_3$ dissolved in molten $Th(NO_3)_4 \cdot 4H_2O$ at temperatures of about 90°C wherein the weight ratio of the molten material to the uranium compound to the molten material is at least 17.4 to 1.

7. The process of claim 1 wherein said oxide is $UO_2$, $UO_3$ or $U_3O_8$ and wherein said oxide is dissolved in molten $UO_2(NO_3)_2 \cdot 6H_2O$ wherein the molar ratio of nitrate to uranium is 1.68 to 1.83.

8. The process of claim 1 wherein dilution results in 3 to 3.5 molar concentration of said actinide.

* * * * *